United States Patent
Bora et al.

(10) Patent No.: US 12,354,106 B2
(45) Date of Patent: Jul. 8, 2025

(54) BEHAVIOR-GENERATED AND CLIENT-EVENT SIGNED IMMUTABLE TRANSACTIONS

(71) Applicant: Bank of America Corporation, Charlotte, NC (US)

(72) Inventors: Geeta Bora, Hyderabad (IN); Vijay Kumar Yarabolu, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 359 days.

(21) Appl. No.: 17/899,741

(22) Filed: Aug. 31, 2022

(65) Prior Publication Data
US 2024/0070674 A1   Feb. 29, 2024

(51) Int. Cl.
| | |
|---|---|
| G06Q 20/40 | (2012.01) |
| G06F 3/04842 | (2022.01) |
| G06F 3/0485 | (2022.01) |
| G06Q 20/38 | (2012.01) |

(52) U.S. Cl.
CPC ..... *G06Q 20/4016* (2013.01); *G06Q 20/3827* (2013.01); *G06F 3/04842* (2013.01); *G06F 3/0485* (2013.01); *G06Q 2220/00* (2013.01)

(58) Field of Classification Search
CPC .......... G06Q 20/4016; G06Q 20/3827; G06Q 2220/00; G06F 3/04842; G06F 3/0485
See application file for complete search history.

(56) References Cited

U.S. PATENT DOCUMENTS

| | | | |
|---|---|---|---|
| 8,887,286 B2 | 11/2014 | Dupont et al. | |
| 11,354,555 B1* | 6/2022 | Yee | G06Q 20/3672 |
| 11,405,189 B1* | 8/2022 | Bennison | H04L 63/0807 |
| 2020/0177373 A1 | 6/2020 | Komandur et al. | |
| 2020/0272619 A1 | 8/2020 | Alferov | |
| 2022/0148111 A1* | 5/2022 | Wright | G06Q 10/06 |

(Continued)

OTHER PUBLICATIONS

Krawczyk et al., "HMAC: Keyed-Hashing for Message Authentication" Feb. 1997, retrieved from https://datatracker.ietf.org/doc/html/rfc2104. (Year: 1997).*

(Continued)

*Primary Examiner* — Jamie R Kucab
*Assistant Examiner* — Scott Michael Diroma
(74) *Attorney, Agent, or Firm* — Banner & Witcoff, Ltd.

(57) ABSTRACT

Computer-implemented cyber-security, behavior-generated, event-type signed processes and machines provide for authentication and immutable transactions to overcome security risks. Clients submit requests for an immutable transactions and interactions responsive to the request are sent by the server to the client. The server generates behavioral expectations for the interactions, stores them for future comparison purposes, and transmits those to the client. The client executes user events for the interactions. The client behaviorally analyzes the user events and generates behavioral vectors corresponding to the user events. Intermediate client hashes that culminate in a final client hash are generated. User events are sent to the server. The server generates a server hash based on the behavioral expectations and the user events. The server compares the final client hash to the server hash to determine if the transaction is authentic and should be stored as immutable.

20 Claims, 10 Drawing Sheets

Behavior Signed Immutable Hash Generation

(56) References Cited

U.S. PATENT DOCUMENTS

| | | | |
|---|---|---|---|
| 2022/0222650 A1* | 7/2022 | Shauh | G06Q 20/401 |
| 2022/0284178 A1* | 9/2022 | Rule | G06F 21/35 |
| 2022/0300656 A1* | 9/2022 | White | G06F 21/6227 |

OTHER PUBLICATIONS

Zhenxing Liu, H. S. Lallie, Lu Liu, Yongzhao Zhan and Kaigui Wu, "A hash-based secure interface on plain connection," 2011 6th International ICST Conference on Communications and Networking in China (CHINACOM), Harbin, 2011, pp. 1236-1239, doi: 10.1109/ChinaCom.2011.6158347. (Year: 2011).*

A. Bhand, V. Desale, S. Shirke and S. P. Shirke, "Enhancement of password authentication system using graphical images," 2015 International Conference on Information Processing (ICIP), Pune, India, 2015, pp. 217-219, doi: 10.1109/INFOP.2015.7489381. (Year: 2015).*

* cited by examiner

Please enter your login credentials for secure account access.

Enter User Name  220                226  Forgot User Name

Enter Password  222                 Forgot Password/Unlock User Id
                                    228

☐ Remember my User Name
      224
                                    230
                    Log In

FIG. 2B

Please enter your information below to help us verify your identity.

Account Number

Required       232

SSN/TIN

Required       234

Date of Birth  236/238/240              246    248
MM/DD/YYYY                               ▽     (?)

Zip Code
               242                              250
Required                                        (?)

Email Address  244
MyEmail@MyDomain.com

252
Cancel                                          Next

FIG. 2C

| 270 User Action | 272 Event Type | 278 Event Code | 280 UI Coordinates | 282 UI Code |
|---|---|---|---|---|
| Click on User Name TextBox | Click | TxtClk0813 | (74,874) | UI_CD_8433 |
| | Focus_In | Ev7432 | (74,874) | UI_CD_8433 |
| Type User Name | Type Physical Keys | (Ev87,Ev23,Ev93,Ev10) | | |
| Click on Password TextBox | Click | TxtClk0813 | (86,927) | UI_CD_9201 |
| | Focus_out | Ev987 | (86,927) | UI_CD_9201 |
| | Focus_In | Ev7432 | (86,927) | UI_CD_9201 |
| Type Password | Type Physical Keys | Password_Evt_76483 | (86,927) | |
| Click on Remember this Radio Button | Click | RdoClk1055 | (95,983) | UI_CD_9332 |
| | Focus_out | Ev987 | (95,983) | UI_CD_9332 |
| | Focus_In | Ev7432 | (95,983) | UI_CD_9332 |
| ScrollDown | Scroll | EvtScroll_104 | | |
| | Focus_out | Ev987 | (95,983) | UI_CD_9332 |
| Click on Continue Button | Click | CmdClk1000 | (103,1160) | UI_CD_1321 |
| | Focus_out | Ev987 | (103,1160) | UI_CD_1321 |
| | Focus_In | Ev7432 | (103,1160) | UI_CD_1321 |

Fig. 2F - Sample Event and UI Codes

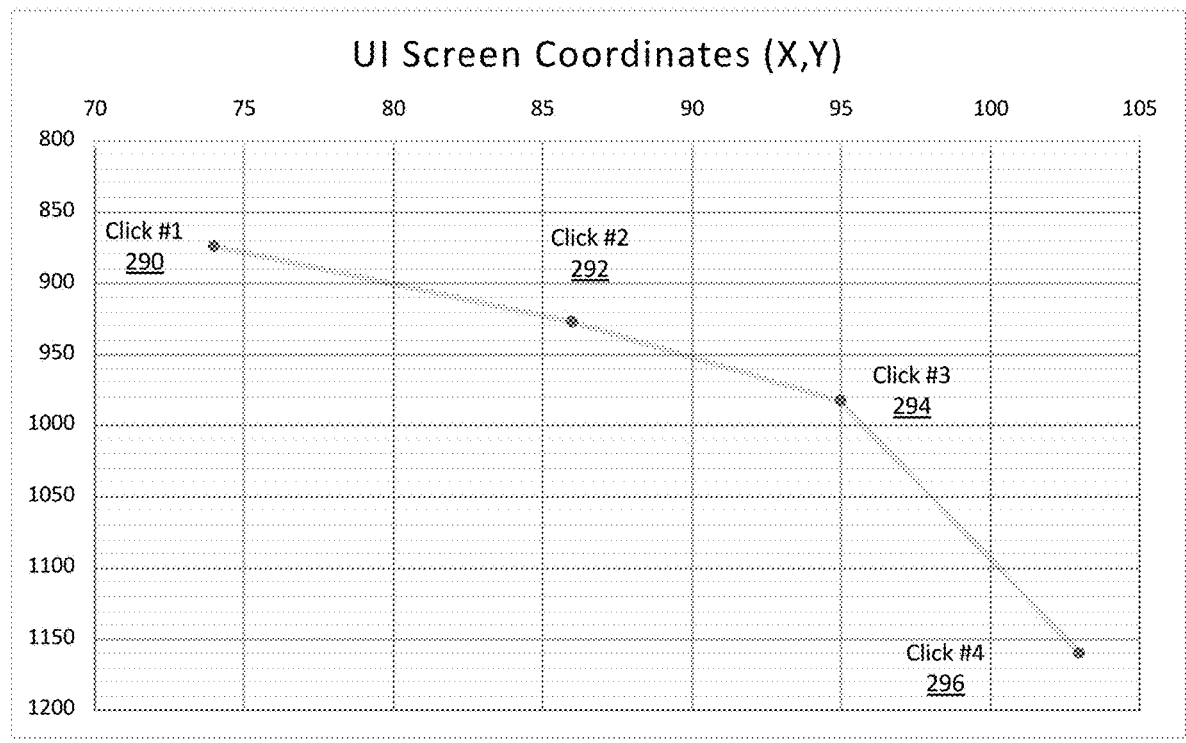

Fig. 2G - Sample UI Coordinates for UI Codes to Form Behavior Vector

Process Flow

| Step Description 500 | Component Code 502 | Prev Compliance & Integrity Token (Hash Value) 504 |
|---|---|---|
| Authentication | Component_S004 | |
| Transfers | Component_S008 | Hash001 |
| Schedule Transfers | Component_S012 | Hash002 |
| Enter Details | Component_S034 | Hash003 |
| Review Details | Component_S046 | Hash004 |
| Confirm Transfers | Component_S089 | Hash005 |
| Transfer Successful | Component_S094 | Hash006 |

| Current Complaince & Integrity Token (Hash Value) 506 |
|---|
| Hash(Component_S004 + AuthDetails + " " ) = Hash001 |
| Hash(Component_S008 + " " + Hash001) = Hash002 |
| Hash(Component S012 + " " + Hash002) = Hash003 |
| Hash(Component_S034 + Transter Data + Hash003) = Hash004 |
| Hash(Component_S046 + " " + Hash004) = Hash005 |
| Hash(Component_S089 + " " + Hash005) = Hash006 |
| Hash(Component_S094 + " " + Hash006) = Hash007 |

FIG. 5

BEHAVIOR-GENERATED AND CLIENT-EVENT SIGNED IMMUTABLE TRANSACTIONS

TECHNICAL FIELD OF DISCLOSURE

The present disclosure relates to processes and machines for information security including the prevention and detection of unauthorized data modification with respect to falsification or theft of data and alteration of data inconsistent with defined security policies to control data tampering by limiting access to authorized entities or processes for general access control or authentication of information security by making transactions immutable through the use of cyber-security, behavior-generated, event-type signed processes and machines.

BACKGROUND

Transactions generated in a client-facing or third-party applications are susceptible to man-in-the-middle and parameter tampering attacks. This can occur if an attacker is able to observe and/or intercept network communication traffic for a proposed transaction. The attacker can then modify the transaction to accomplish their theft or otherwise unauthorized and/or unlawful activities.

As an example, consider a proposed online transaction in which funds are to be transferred from one person to another, or from one account to another. If an attacker can observe and/or intercept the network packet traffic, the attacker potentially can tamper with details of the transaction such as altering the amount of the funds that are to be transferred and/or switching the intended recipient for the funds. Oftentimes, this can occur because client-generated transactions, transmitted to and received from, servers are not immutable by nature and are usually in human-readable formats (e.g., JSON or XML), which makes the transactions more susceptible to attack by changing transaction information during transmission to the server.

Further, such client-server transactions typically are not encrypted, which further increases the security risk. This is because encryption is computationally expensive, and it is difficult to use encrypted data for further data analysis.

Hence there is a long felt and unsatisfied need in the field of cyber security to secure transactions such as, for example, by creating behavior-generated and client-event signed immutable transactions.

SUMMARY

In accordance with one or more arrangements of the disclosures contained herein, solution(s) are provided to address one or more of the shortcomings in the cyber security industry by, inter alia, providing effective detection of tampered transactions and preventing transaction processing when tampering is suspected, mapping client-specific events to unique known codes, and signing transactions immutably with a unique hash value that is generated by a user's behavior and transaction flow through a series of UI interactions (e.g., a series of screens or user interfaces relating to the proposed transaction), which is then used for transaction authentication. As used herein, behavior-generated/event-signed can refer generically to any combination of one or more user actions, event types, event codes, user interface (UI) coordinates, and/or UI codes that are utilized in various ways to create authentication hashes.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a cyber-security, behavior-generated, event-type signed process can perform the steps of: transmitting, by a client to a server, a request for an immutable transaction; transmitting, by the server to the client, interactions responsive to the request; generating, by the server, behavioral expectations for the interactions; transmitting, from the server to the client, the behavioral expectations; executing, at the client, user events for the interactions; analyzing behaviorally, by the client, the user events; generating, by the client, behavioral vectors corresponding to the user events; generating, by the client based on the behavioral vectors, intermediate client hashes that culminate in a final client hash; transmitting, by the client to the server, the user events; generating, by the server based on the behavioral expectations and the user events, a server hash; comparing, by the server, the final client hash to the server hash; approving, by the server, the immutable transaction if the final client hash matches the server hash; and rejecting, by the server, the immutable transaction if the final client hash does not match the server hash.

In some arrangements, interactions can be graphical user interfaces with contents that include user-input options with corresponding event types and user-interface (X-Y) coordinates corresponding to where in the graphical user interfaces the user-input options are located. Sample user-input options include textboxes; mouse or input device selection by clicking, tapping, or the like; scrolling; keyboard typing; microphone dictating; hyperlink or graphical object selection; etc.

In some embodiments, user interface (X,Y) coordinates can correspond to unique UI codes for each graphical user interface.

In some embodiments, behavioral vectors can be based on the event codes and the user-interface (X-Y) coordinates. They can be one dimensional, two dimensional, or otherwise multidimensional if desired.

In some embodiments, client hashes can be based on one or more behavioral vectors, which can correspond to one or more graphical user interfaces.

In some embodiments, client hashes can be based on one or more behavioral vectors and at least one prior client hash.

In some embodiments, a cyber-security, behavior-generated, event-type signed process can also perform the steps of: (a) detecting, by the server, tampering if the final client hash does not match the server hash, and (b) reporting, by the server, the tampering.

In some embodiments, behavioral analysis can be performed based on artificial intelligence, machine learning, or other rule-based learning.

In some arrangements, transaction request denials and/or approvals can be generated by a compliance watcher depending on whether hashes values match.

In some arrangements, hash values can be calculated by addition of prior transaction evidence and current transaction evidence.

In some arrangements, step descriptions and component codes for transaction requests can be used to generate hashes.

In some arrangements, a compliance watcher can utilize governing rules to determine whether to approve or deny transaction requests.

In some arrangements, hash tokens can comprise compliance hashes and validation hashes. And, in some arrangements, the hash tokens can comprise previous compliance and integrity tokens and current compliance and integrity tokens.

In some arrangements, previous compliance and integrity tokens can be generated based on step descriptions and component codes.

In some arrangements, current compliance and integrity tokens can be generated based on component codes and step descriptions.

In some embodiments, a cyber-security, behavior-generated, event-type signed process can perform steps such as, for example: transmitting, by a client to a server, a request for an immutable transaction; transmitting, by the server to the client, a series of graphical user interfaces responsive to the request, said graphical user interfaces having contents that include user-input options with corresponding event types and user-interface (X-Y) coordinates corresponding to where in the graphical user interfaces the user-input options are located, said user-input options selected from the group consisting of: first input-device clicking in the textboxes and keyboard typing in the textboxes, second input-device selection of one or more linked graphical objects or text hyperlinks in the graphical user interfaces, and scrolling within the graphical user interfaces; generating, by the server, behavioral expectations for the graphical user interfaces, said behavioral expectations corresponding to what the server at least wholly or partially sequentially (or alternatively wholly or partially non-sequentially) at least partially expects to receive from the client for the event types and the user-interface (X-Y) coordinates as to where in the graphical user interfaces the user-input options are located; transmitting, from the server to the client, the behavioral expectations; executing, at the client, user events for the graphical user interfaces; analyzing behaviorally, by the client using artificial intelligence or machine learning, the user events; generating, by the client, behavioral vectors corresponding to the user events, said behavioral vectors composed based on the event codes and the user-interface (X-Y) coordinates; generating, by the client based on the behavioral vectors, intermediate client hashes for each of the graphical user interfaces that culminate in a final client hash; transmitting, by the client to the server, the user events; generating, by the server based on the behavioral expectations and the user events, a server hash; comparing, by the server, the final client hash to the server hash; approving, by the server, the immutable transaction if the final client hash matches the server hash; detecting, by the server, tampering if the final client hash does not match the server hash; reporting, by the server, the tampering; and rejecting, by the server, the immutable transaction if the final client hash does not match the server hash.

In some arrangements, one or more various steps of processes disclosed herein can be implemented in whole or in part as computer-executable instructions stored on computer-readable media.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIGS. 2B-2E are sample interaction screens with various user-selectable fields for data entry that can be associated with event types and event data as well as have user interface coordinates and/or corresponding UI location codes in accordance with one or more cyber-security, behavior-generated/client-event signed, immutable-transaction aspects of this disclosure.

FIG. 2F is a sample table identifying potential user actions, event types, event codes, and descriptions, user interface coordinates and corresponding coordinate codes in accordance with one or more cyber-security, behavior-generated/client-event signed, immutable-transaction aspects of this disclosure.

FIG. 2G is a sample representation of UI coordinates from FIG. 2F that illustrate sample positional actions in FIG. 2F, which correspond to UI codes and are transformed into one or more behavior vectors in accordance with one or more cyber-security, behavior-generated/client-event signed, immutable-transaction aspects of this disclosure.

FIG. 5 shows sample generation of hashes in accordance with one or more cyber-security, behavior-generated/client-event signed, immutable-transaction aspects of this disclosure.

DETAILED DESCRIPTION

Figure 1:
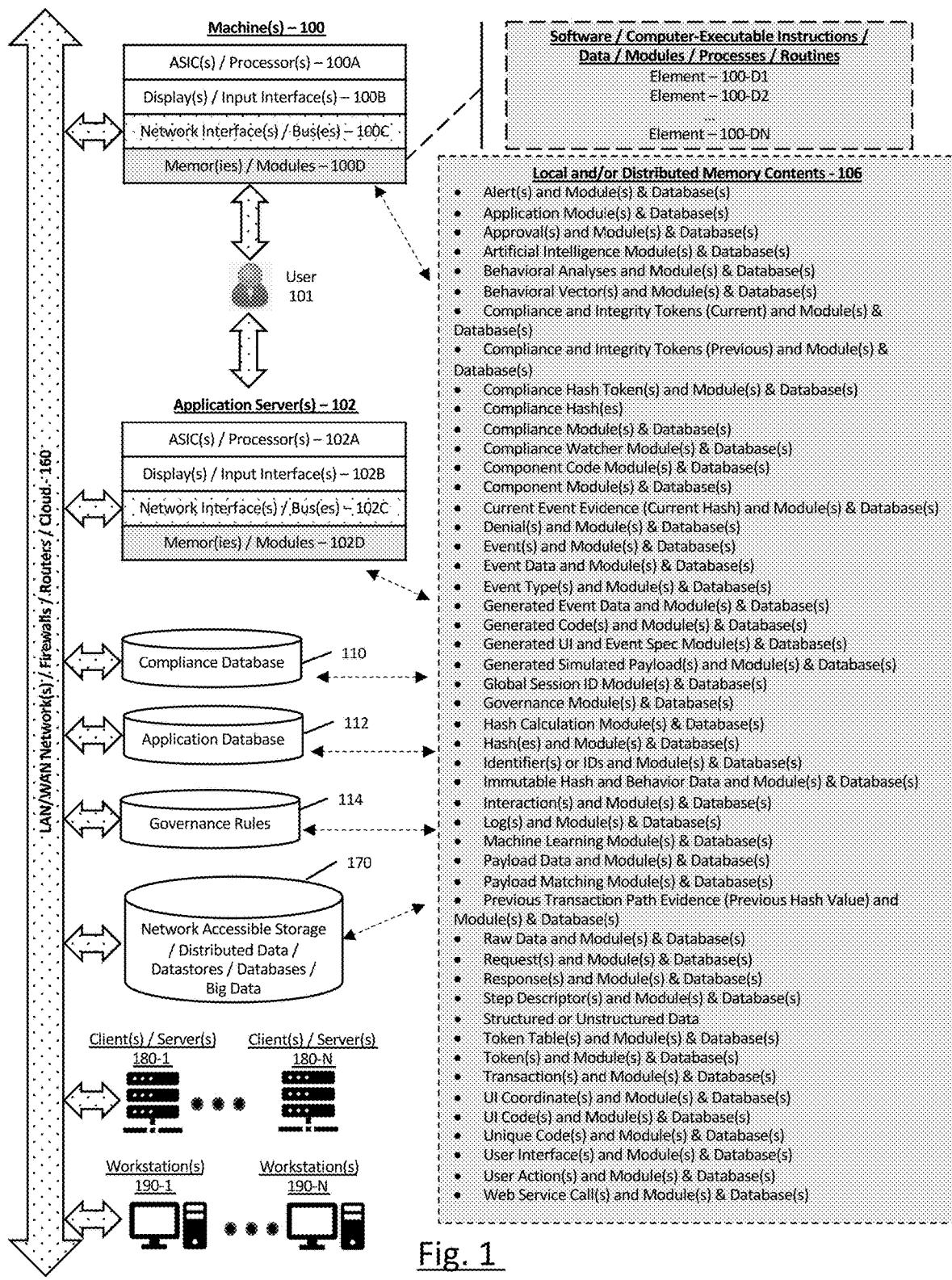
FIG. 1 depicts exemplary operating environment(s) and functionality for information security machines and processes to implement one or more cyber-security, behavior-generated/client-event signed, immutable-transaction aspects of this disclosure.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (e.g., 100, 102, 180-1 . . . 180-N, 190-1 . . . 190-N, etc.) can include one or more general-purpose, customized, configured, special-purpose, virtual, physical, and/or network-accessible devices such as: administrative computers, application servers, clients, clusters, compliance watchers, computing devices, computing platforms, controlled computers, controlled computers, controlling computers, desktop computers, distributed systems, enterprise computers, instances, laptop devices, monitors or monitoring systems, nodes, notebook computers, personal computers, portable electronic devices, servers, smart devices, streaming servers, tablets, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any particular type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc. (e.g., 100A, 102A, etc.), display(s) and/or input interfaces/devices (e.g., 100B, 102B, etc.), network interfaces, communication buses, or the like (e.g., 100C, 102C, etc.), and memories or the like (e.g., 100D, 102D, etc.), which can include various sectors, locations, structures, or other electrical elements or components. Other specific or general components, machines, or the like are not depicted in the interest of brevity and would be understood readily by a person of skill in the art. One or more sample(s) of the foregoing, some of which are expressly depicted, can be seen in FIG. 1 along with one or more sample associated components, subcomponents, related elements, sub-elements, etc.

As used throughout this disclosure, software, computer-executable instructions, data, modules, processes, routines, or the like can include one or more: active-learning, algorithms, alerts, applications, application program interfaces (APIs), artificial intelligence, approvals, attachments, behavior predicting and behavioral analysis, behavior and/or event signing, behavior vectors, big data, component codes, cryptography, cryptographic hashes, daemons, databases, datasets, drivers, data structures, emails, encryptions, event codes, event types, file systems or distributed file systems, firmware, governance rules, graphical user interfaces (GUI or UI), hashes, images, instructions, interactions, machine learning, middleware, modules, objects, operating systems, platforms, processes, protocols, programs, rejections, routines, scripts, tools, transactions, user interface coordinates (e.g., X-Y coordinates), user actions, user interface codes, utilities, etc.

In the context of this disclosure, artificial intelligence deals with imparting the decisive ability and thinking ability to the cyber-security, behavior-generated, event-type signed processes and machines. It is a blend of computer science, data analytics, and computer-implemented mathematics, and can include classification algorithms (e.g., Naive Bayes, Decision Tree, Random Forest, Support Vector Machines, K Nearest Neighbors, etc.), regression algorithms (e.g., Linear Regression, Lasso Regression, Logistic Regression, Multivariate Regression, Multiple Regression, etc.), clustering algorithms (e.g., K-Means Clustering, Fuzzy C-mean, Expectation-Maximisation, Hierarchical Clustering, etc.), etc. Machine learning in the context of this disclosure is closely related and may be considered in some instances to overlap with artificial intelligence wholly or partially. In the context of this disclosure, machine learning can be supervised, semi-supervised, reinforcement, and/or unsupervised learning, such as, for example, any type of rule-based learning. Sample algorithms can include bidirectional LSTM, Logistic Regression, XG Boost, Random Forest, etc. Natural language processing may also be utilized if desired.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Examples can be seen in FIG. 1 as memor(ies)/module(s) 100D, 102D along with samples of the foregoing generically represented, in one instance for illustrative purposes, as any number of components, modules or the like such as element—100-D1, element—100-D2, element—100-D3 (not shown for brevity), element—100-D4 (not shown for brevity), element—100-D5 (not shown for brevity), . . . element—100-DN in one or more sectors, locations, components, etc. Some or all the foregoing may additionally and/or alternatively be stored similarly and/or in a distributed manner in compliance database 110, application database 112, governance rules 114, and/or network accessible storage/distributed data/datastores/databases/big data etc. 170.

Sample local and/or distributed memory (or the like) contents in accordance with the foregoing may include, as shown in sample structure 106, software, computer-executable instructions, data, modules, process, routines or the like, such as: Alert(s) and Module(s) & Database(s), Application Module(s) & Database(s), Approval(s) and Module(s) & Database(s), Artificial Intelligence Module(s) & Database(s), Behavioral Analyses and Module(s) & Database(s), Behavioral Vector(s) and Module(s) & Database(s), Compliance and Integrity Tokens (Current) and Module(s) & Database(s), Compliance and Integrity Tokens (Previous) and Module(s) & Database(s), Compliance Hash Token(s) and Module(s) & Database(s), Compliance Hash(es), Compliance Module(s) & Database(s), Compliance Watcher Module(s) & Database(s), Component Code Module(s) & Database(s), Component Module(s) & Database(s), Current Event Evidence (Current Hash) and Module(s) & Database(s), Denial(s) and Module(s) & Database(s), Event Data and Module(s) & Database(s), Event Type(s) and Module(s) & Database(s), Event(s) and Module(s) & Database(s), Generated Code(s) and Module(s) & Database(s), Generated Event Data and Module(s) & Database(s), Generated Simulated Payload(s) and Module(s) & Database(s), Generated UI and Event Spec Module(s) & Database(s), Global Session ID Module(s) & Database(s), Governance Module(s) & Database(s), Hash Calculation Module(s) & Database(s), Hash(es) and Module(s) & Database(s), Identifier(s) or IDs and Module(s) & Database(s), Immutable Hash and Behavior Data and Module(s) & Database(s), Interaction(s) and Module(s) & Database(s), Log(s) and Module(s) & Database(s), Machine Learning Module(s) & Database(s), Payload Data and Module(s) & Database(s), Payload Matching Module(s) & Database(s), Previous Transaction Path Evidence (Previous Hash Value) and Module(s) & Database(s), Raw Data and Module(s) & Database(s), Request(s) and Module(s) & Database(s), Response(s) and Module(s) & Database(s), Step Descriptor(s) and Module(s) & Database(s), Structured or Unstructured Data, Token Table(s) and Module(s) & Database(s), Token(s) and Module(s) & Database(s), Transaction(s) and Module(s) & Database(s), UI Code(s) and Module(s) & Database(s), UI Coordinate(s) and Module(s) & Database(s), Unique Code(s) and Module(s) & Database(s), User Action(s) and Module(s) & Database(s), User Interface(s) and Module(s) & Database(s), Web Service Call(s) and Module(s) & Database(s), etc.

The foregoing software, computer-executable instructions, data, modules, processes, routines, or the like, when executed—individually and/or collectively across—one or more various computers, machines, or the like (or any components therein) may cause ASICs, processor(s), core(s), executor(s), etc. to perform one or more artificial intelligence, machine learning and/or other above-referenced functions relevant to cyber-security behavior-generated/event-signed authentication and/or may store or otherwise maintain information that may be used in one or more aspects of this disclosure.

As used throughout this disclosure, computer "networks," topologies, or the like (e.g., 160, etc.) can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTP or any other type of suitable communication, transmission, and/or other packet-based protocol. One or more sample(s) of the foregoing, some of which are expressly depicted, can be seen in FIG. 1 along with their associated components, subcomponents, related elements, sub-elements, etc.

Accordingly, and as described briefly above, a skilled artisan will understand that FIG. 1 depicts exemplary operating environment(s) and functionality for information security machines and processes to implement one or more cyber-security behavior-generated/client-event signed immutable-transaction aspects of this disclosure.

Figure 2A:
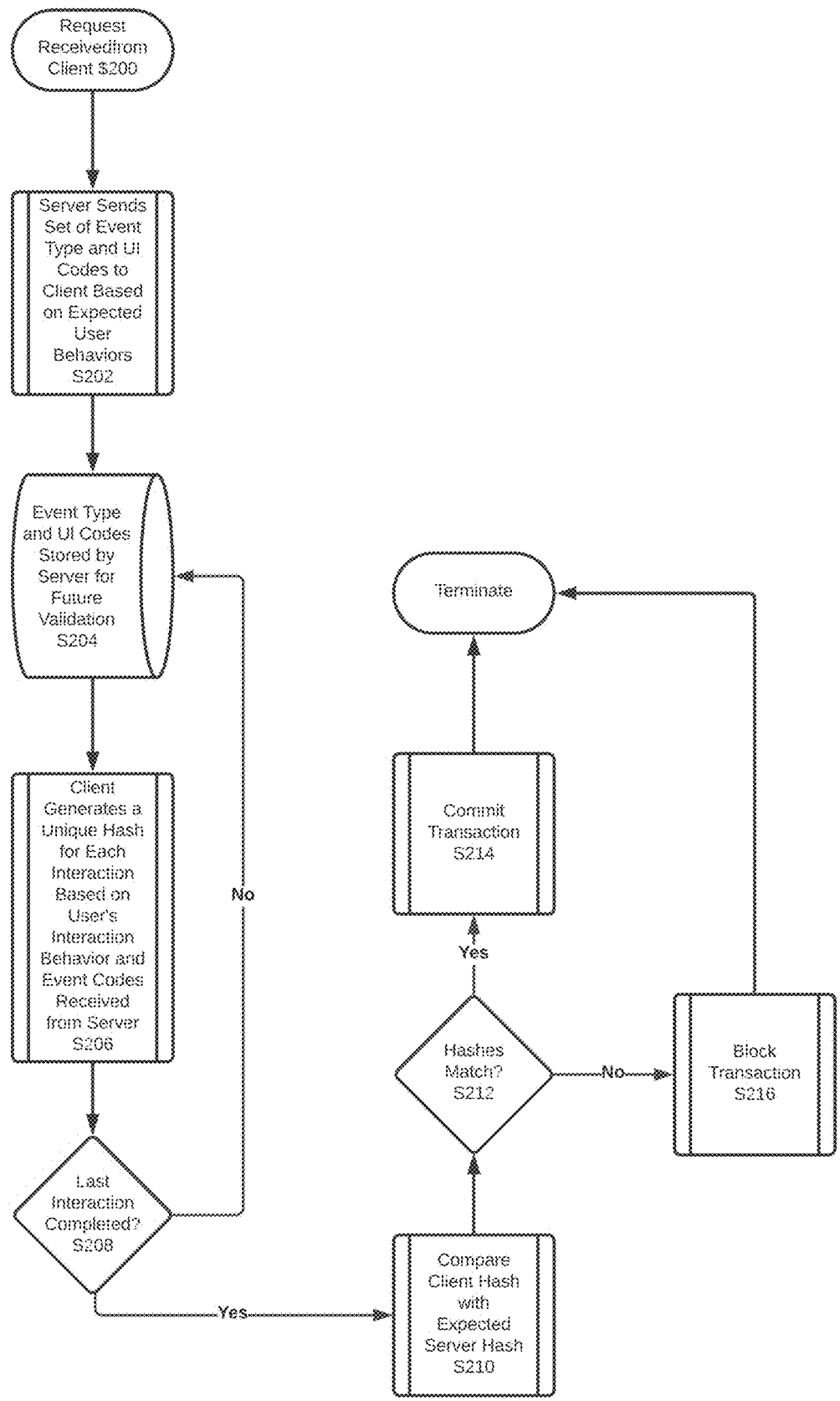
FIG. 2A is a sample flow diagram illustrating how to implement one or more cyber-security, behavior-generated/client-event signed, immutable-transaction aspects of this disclosure.

By way of non-limited reference and explanation, FIG. 2A is a sample flow diagram illustrating how to implement one or more one or more cyber-security behavior-generated/client-event signed immutable-transaction aspects of this disclosure. It can be implemented with or without artificial intelligence, machine learning, or the like, etc. Incoming requests received by a server from a client may be monitored in S200. The server can send one or more sets of event types, event codes, UI coordinates, and/or UI codes to the client based on expected user behaviors and/or expected interactions with various user interfaces in transaction flow(s) in S202. Event type and UI codes can be stored by the server for future validation, authentication, and/or comparison purposes in S204.

The client can generate a unique hash for each interaction based on the user's interaction behavior and event codes received from the server in S206. This process can repeat until the last interaction is completed S208. Hashes may be formed by the examples and processes depicted in FIGS. 4A, 4B, and 5.

Server comparison(s) of client hashes can be made with respect to actual hashes and expected hashes in S210. If hashes match in S212, the transactions can be confirmed as authentic and committed in S214. Otherwise, transactions are blocked when the hashes do not match in S216.

Component codes can be assigned and used to build a hash at each step for every transaction like shown in FIG. 5. An alert and monitoring system also can be implemented for the data stored in different forms such as logs, raw data, and structured data. Whenever a transaction or log is altered or deleted, a monitoring model can compare with an integrity and compliance hash value or other hash. If the transaction change does not adhere to the governing rules, an alert can be triggered and the activity may be reverted or blocked.

As used herein, a hash is a function that converts one value to another. Hashing data is a common practice in computer science and is used for several different purposes. Examples include cryptography, compression, checksum generation, and data indexing. Hashing is a natural fit for cryptography and cyber-security behavior-generated/client-event signed transactions, because it masks the original data with another value. A hash function can be used to generate a value that can only be decoded by looking up the value from a hash or token table. The table may be an array, database, vector, or other data structure. A good cryptographic hash function is non-invertible, meaning it cannot be reverse engineered. Further, making the hash(es) immutable ensures the authenticity of the proposed transaction(s).

Hashes are also used to generate checksums, which are used to ensure that transactions are not corrupted or tampered with. Typically, checksums are small values generated based on the bits in a request, transaction, file, or block of data, and used to verify that the data is correct and/or the proposed transaction is authentic. Checksum functions on transactions (such as those over the Internet) should produce hashed values that are the same as those produced by the original data when the function is run. If the transaction does not produce the same checksum as before, this indicates that something in the transaction has been changed.

Lastly, hashes are used to organize and index data. Data can be mapped to individual "buckets" within a hash table using hashing values, which are stored in a database or token table or the like. Each bucket can be identified by a unique ID, which serves as a pointer to the underlying data. This results in an index that can be significantly smaller than the original data, allowing for more efficient searching and accessing of the values. All types of hashes and the like are within the spirit and scope of this disclosure.

FIGS. 2B-2E are sample interaction screens (e.g., GUIs or UIs) with various user-selectable fields for data entry that can be associated with event types and event data as well as have user interface coordinates and/or corresponding UI location codes in accordance with one or more one cyber-security, behavior-generated/client-event signed, immutable-transaction aspects of this disclosure.

In FIG. 2B, a user interface, which provides for a user interaction (e.g., interactive GUI or UI), may request login credentials to ensure secure account access and authentication for proposed transactions. This may include any types of user-fillable fields, user-selectable graphical objects, and/or user-selectable hyperlinks such as: username field 220, password field 222, user-selectable check box 224 to remember the username, a link 226 if the user forgot their user name, a link 228 if the user forgot their password and/or to unlock a user ID, a login or commit button 230, etc. The server would know the UI coordinates of each as well as the type of text and/or graphical interaction to expect such that the server can predict hash values based on the user's behavior and/or navigation through one or more fields or objects in the UI that are located at various UI coordinates and the events that occur at one or more of the same.

FIG. 2C shows a sample of another user interface, which provides for another user interaction, that can be used if, for example, the user clicks the Forgot Username link 226 in FIG. 2B. As shown in FIG. 2C, this interaction may have text-entry fields (e.g., textboxes) such as, for example, for an account number 232, SSN/TIN 234, date of birth including unified (or separate as shown) month 236, day 238, and year 240 fields, a zip code 242, and email address 244. Other user-selectable objects may include a dropdown button 246 to allow graphical selection in a calendar for the date of birth or help buttons 248 or 250. A "next" button 252 may be provided as well. Again, each field and object will have its own coordinates (i.e., X-Y coordinates in the UI) that have a corresponding UI code and will also have a corresponding type of available events and with a corresponding event code. Again, for this interaction in a transaction flow, the server could know in advance (or determine in real-time) the UI coordinates of each as well as the type of text and/or graphical interaction to expect such that the server can predict hash values based on the user's behavior and/or navigation through one or more fields or objects in the UI that are located at various UI coordinates and the events that occur at one or more of the same. This is because the server can know (and have stored previously if desired) the contents and locations of everything on each interaction or UI in advance of a request for a transaction.

Figures 2D, 2E:

FIG. 2D is an example interaction if a dual-channel authentication challenge and/or one time password is used. This could have a field for an authentication code 254, a user-selectable object 256 to reveal the characters as they are entered as part of the code, and could include a hyperlink 256 if the user did not receive the code sent to their other device (e.g., phone, tablet, email account), etc. It could similarly also have a log in or other button 258. Yet again, for this interaction, the server also could know in advance (or determine in real-time) the UI coordinates of each as well as the type of text and/or graphical interaction to expect such that the server can predict hash values based on the user's behavior and/or navigation through one or more fields or objects in the UI that are located at various UI coordinates and the events that occur at one or more of the same.

FIG. 2E is an example of an interaction where the user can enter the details (e.g., 260, 262) for the proposed transaction after having been authenticated by the foregoing or other procedures. Each detail would have its own location and data entry type, which would correspond to various events, event types, UI locations, and UI codes, all of which the server could know in advance (or determine on the fly) and thus be able to anticipate could be received by the server from the client.

FIG. 2F is a sample table identifying potential user actions, event types and descriptions, user interface coordinates and corresponding coordinate codes in accordance with one or more cyber-security behavior-generated/client-event signed immutable-transaction aspects of this disclosure. This table depicts in descending order the sequential user actions 270, which have corresponding event types 272 and event codes 278 as well as user interface coordinates 280 where each of the actions take place on the screen. And each UI X-Y coordinate can have a single UI code for simplicity purposes. The server may use the entries in such a table expecting the actions to be performed sequentially like shown or non-sequentially (not shown for brevity).

As illustrated in FIG. 2F, a flow within this sample transaction could comprise (a) clicking at approximate UI coordinates (74,874) to select a username textbox and typing the username, (b) clicking on the password textbox (e.g., at 86,927) and typing the user password, (c) clicking on a radio button (e.g., at 95,983) to remember the username, (d) scrolling down, and (e) clicking on a continue button located at approximately X-Y coordinate (103, 1160). Thus, each location will have a particular type of action or event that may be expected, and the server may know in advance (or determine on the fly) what each expected event and location will be.

FIG. 2G is a sample representation of UI coordinates from FIG. 2F that illustrate sample positional actions in FIG. 2F, which correspond to UI codes and are transformed into one or more behavior vectors in accordance with one or more cyber-security behavior-generated/client-event signed immutable-transaction aspects of this disclosure. For example, the server can expect a user click at (74,874) Click #1-290, another at (86,927) Click #2-292, a third at (95,982) Click #3-294, and a fourth at (103,1160) Click #4-296. These user interactions may be sequential in nature or may be performed without any particular ordering of actions required. These collective actions can thus be transformed into one or more behavior vectors that correspond to the user events at various locations. The behavior vector may be one dimensional, two dimensional, or multi-dimensional depending on what behavior and actions/events are being tracked or predicted.

Figure 3:
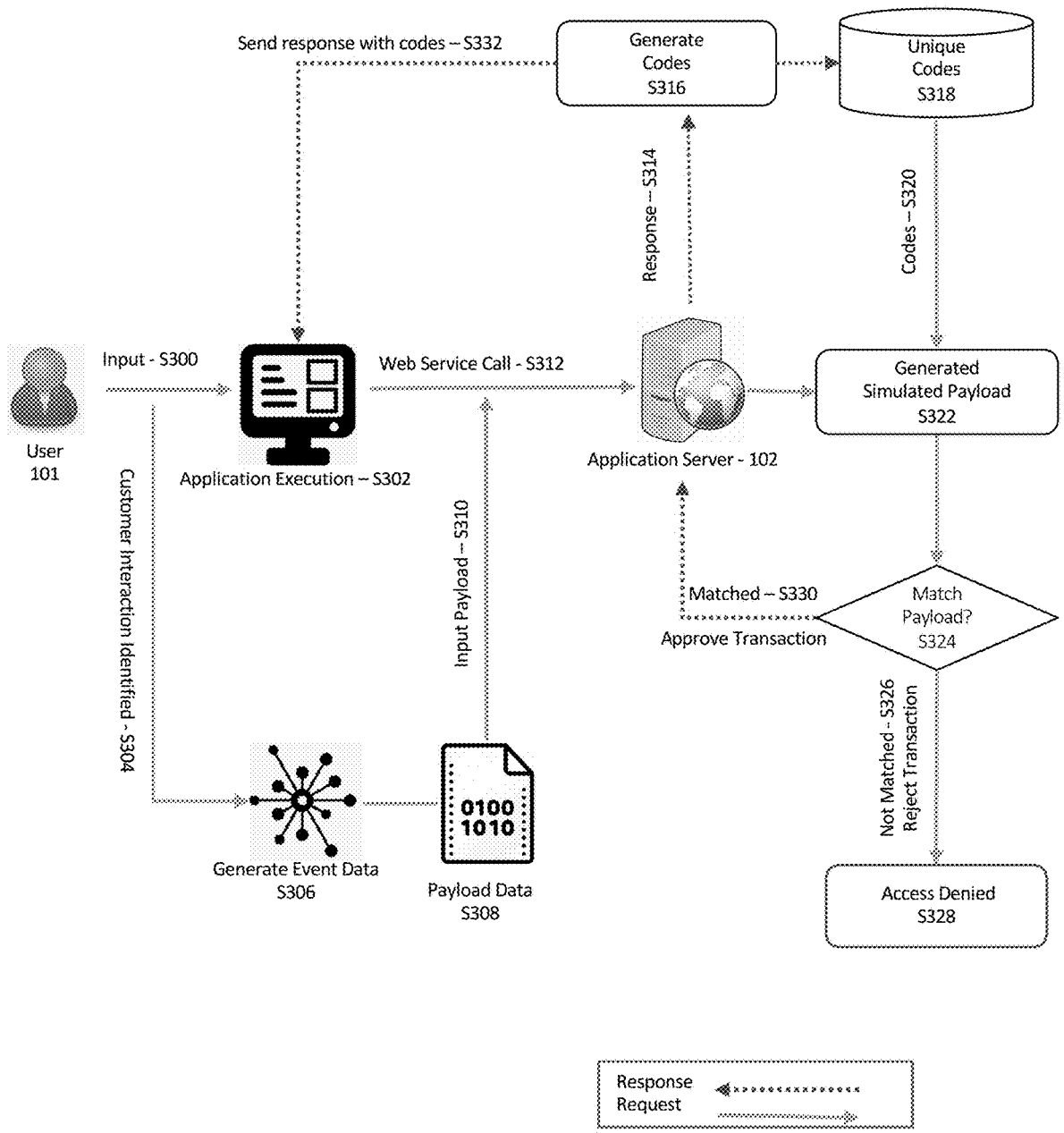
FIG. 3 illustrates a sample flow diagram for implementing one or more cyber-security, behavior-generated/client-event signed, immutable-transaction aspects of this disclosure.

FIG. 3 illustrates a sample flow diagram for implementing one or more cyber-security behavior-generated/client-event signed immutable-transaction aspects of this disclosure. User 101 may interact with an application being executed in S302. This will result in a web service call in S312 that is sent to application server 102. In response thereto S314, the server can generate the codes that it expects to receive in S316. Those unique codes can be stored in memory, a database, or the like in S318. Similarly, the server will send those expected codes in S332 back to the application to be stored as part of the user's data for the user to generate hashes of its own. The input provided to the server by the user 101 (i.e., events at UI coordinates) is used to generate a simulated payload in S322. The application itself will similarly generate an actual payload based on the same information or related information passed to the server. In particular, customer interactions can be identified by the application in S304 and event data can be generated in S306 to result in payload data S308, which is provided to the server in S310.

Ultimately, the payloads or hashes from the server and application are compared in S324 to see if they match and are thus authentic or unmatched thereby indicating tampering. If matched, the transaction is approved in S330 or rejected in S326, which would result in denial and potential logging/alerting of the mismatch or tampering in S328.

Figure 4A:
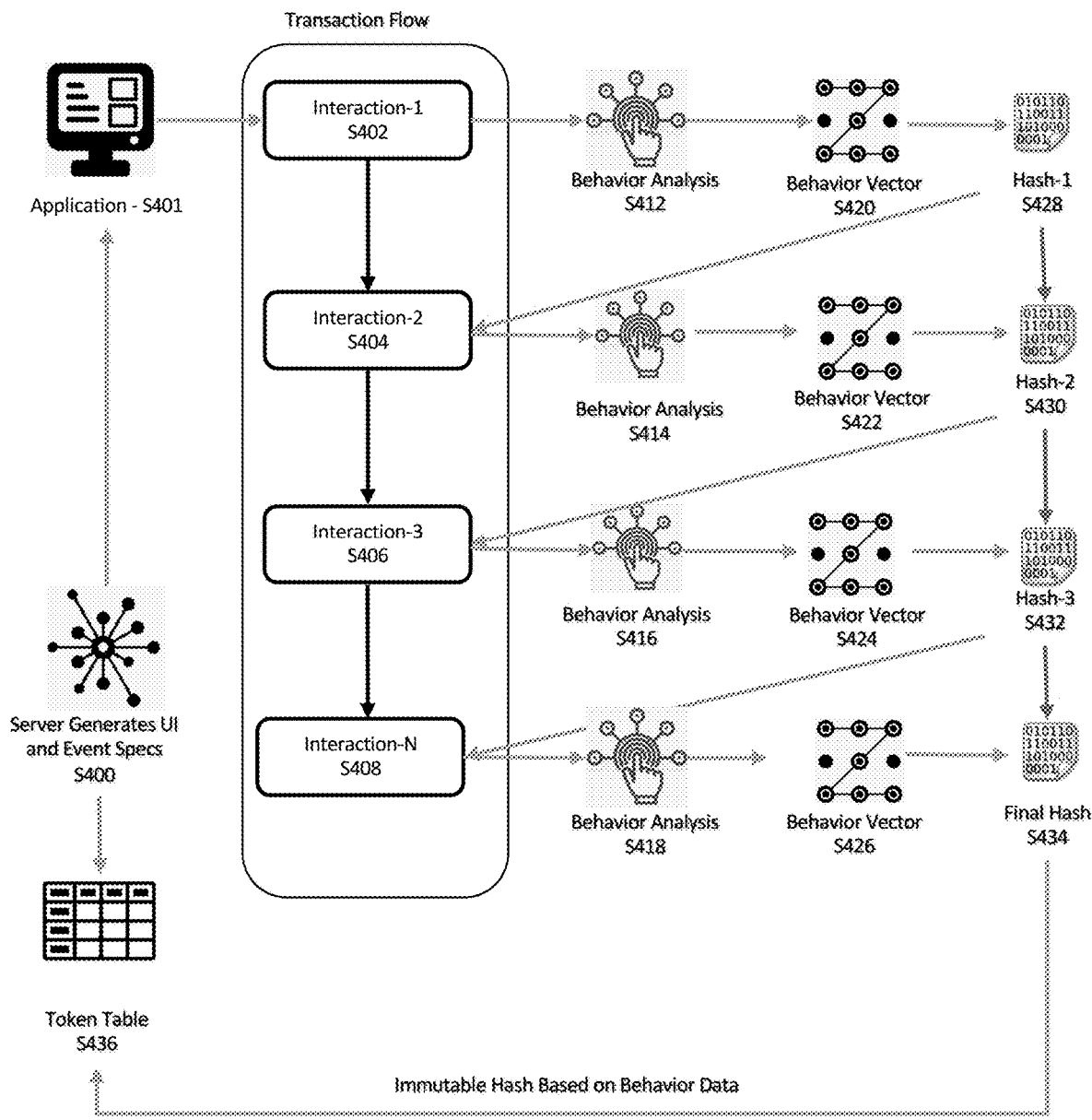
FIG. 4A illustrates how behavior-signed immutable hashes can be created in accordance with one or more cyber-security, behavior-generated/client-event signed, immutable-transaction aspects of this disclosure.

FIG. 4A illustrates how behavior-signed immutable hashes can be generated in accordance with one or more cyber-security behavior-generated/client-event signed immutable-transaction aspects of this disclosure. A server can generate UI and event specifications or expectations S400, which can be provided to the application in S401 for local storage and comparison purposes. Similarly, the server will store these specifications or expectations as well as the hashes that would correspond thereto in the token table S436.

For each UI screen (e.g., interaction), input will be provided to the application in S401 sequentially for interaction nos. 1-N in S402, S404, S408 etc. For each interaction, the user's behavior with respect to the UI screen can be analyzed in S412, S414, S416, S418, etc. and utilized to create a behavior vector S420, S422, S424, S426, etc. for the user's actions on those screens. Each behavior vector can be used to create individual hashes for each interaction in S428, S430, S432, etc., which can result in a final hash for the interaction in S434. Hashes from prior interactions may be utilized in combination with a current interaction such that each hash takes into account some or all prior actions (in additional to specific events and actions on the current screen). For example, Hash-1 can be fed into Interaction-2, Hash-2 can be fed into Interaction-3, Hash-3 can be fed into Interaction-4, and so on until a Final Hash is reached in S434. The final hash is immutable and is based on the user's behavioral data and is then stored in a token table S436. The final hash created by the application can then be compared to what is expected by the server based on the value(s) in the token table.

Figure 4B:
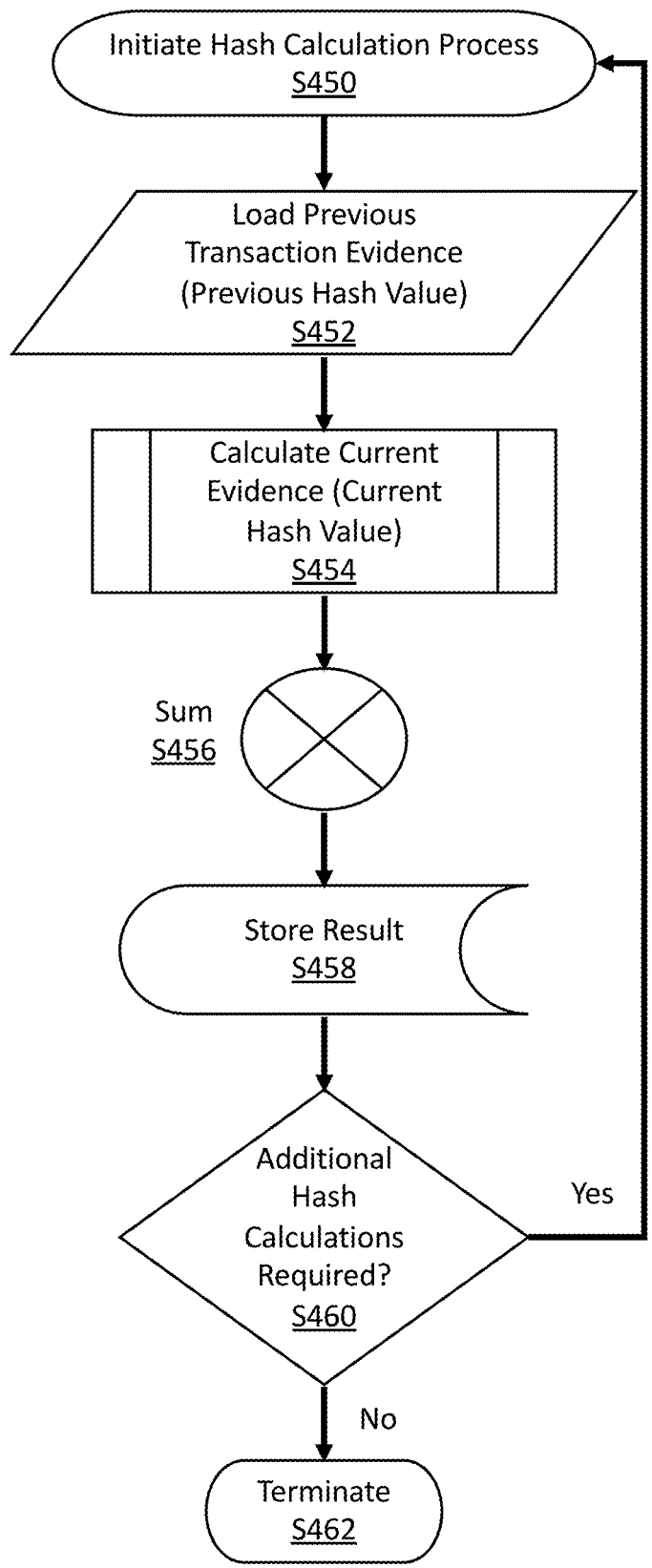
FIG. 4B illustrates a sample calculation process for hashes in accordance with one or more cyber-security, behavior-generated/client-event signed, immutable-transaction aspects of this disclosure.

FIG. 4B illustrates a sample calculation process for hashes in accordance with one or more cyber-security behavior-generated/client-event signed immutable-transaction aspects of this disclosure. The hash calculation process can be implemented in step S450. The previous transaction evidence (previous hash value) can be loaded into memory in S452. The current evidence can be calculated (i.e., current hash value) in S454. The prior and current hash values can be summed in S456 and the result can be stored for future reference and use in S458. If further hash calculations are required S460, the process may be repeated in S450 or the process can be terminated in S462.

FIG. 5 shows sample generation of hashes in accordance with one or more cyber-security behavior-generated/client-event signed immutable-transaction aspects of this disclosure. In this example, a high-level summary of potential steps that may be involved in a transfer process is illustrated. For example, the process may start by authenticating a user, requesting a transfer, scheduling the transfer, entering details about the transfer, reviewing the transfer details, confirming the transfer was successful, and then reporting that the transfer was successful and complete. The present disclosure may be utilized in accordance with any series of transactions and is not limited to this particular transfer example.

In general, the process can be considered, if desired, with respect to four (or more or less) separate linear implementations: a series of step descriptions or other general identifiers 500, corresponding component codes 502 for the step descriptors or descriptions, previous compliance and integrity tokens in the form a previous hash value 504, and resulting current compliance and integrity tokens in the form of current hash values 506.

In short, a step description 500 can be used in conjunction with a component code 502 and a previous compliance and integrity token (prior hash value) 504 to generate a current compliance and integrity token (current hash value) as part of the overall process 506. Some or all of these may be stored for future cyber security use or validation purposes.

Figure 6:
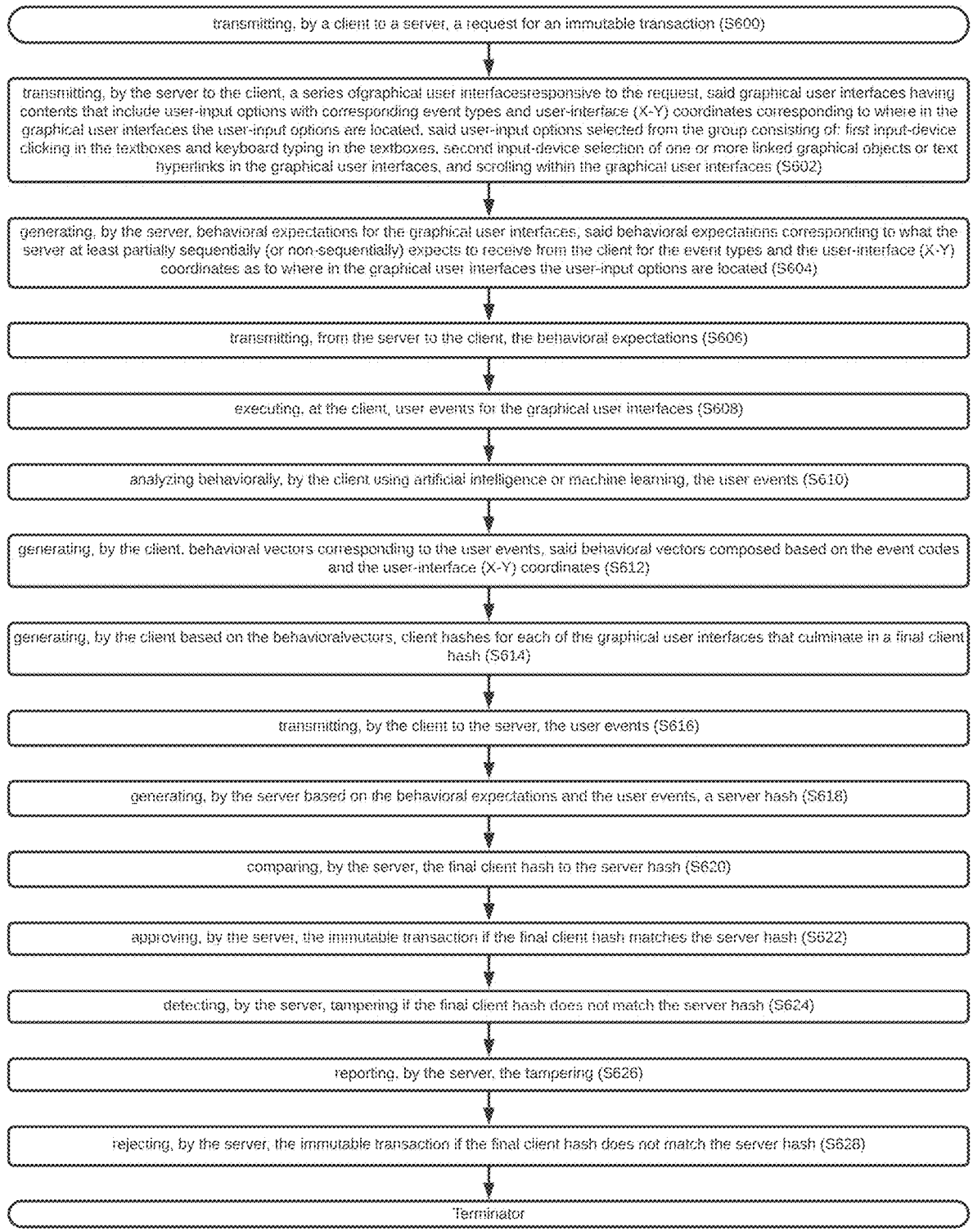
FIG. 6 shows a sample high-level summary of how one or more cyber-security, behavior-generated/client-event signed, immutable-transaction aspects of this disclosure may be implemented.

Last, FIG. 6 shows a sample high-level summary of how one or more cyber-security behavior-generated/client-event signed immutable-transaction aspects of this disclosure may be implemented.

As shown in FIG. 6, a cyber-security, behavior-generated, event-type signed process can perform the steps of: transmitting, by a client to a server, a request for an immutable transaction in S600; transmitting, by the server to the client, a series of graphical user interfaces responsive to the request, said graphical user interfaces having contents that include user-input options with corresponding event types and user-interface (X-Y) coordinates corresponding to where in the graphical user interfaces the user-input options are located, said user-input options selected from the group consisting of: first input-device clicking in the textboxes and keyboard typing in the textboxes, second input-device selection of one or more linked graphical objects or text hyperlinks in the graphical user interfaces, and scrolling within the graphical user interfaces in S602; generating, by the server, behavioral expectations for the graphical user interfaces, said behavioral expectations corresponding to what the server at least partially sequentially (or at least partially non-sequentially) expects to receive from the client for the event types and the user-interface (X-Y) coordinates as to where in the graphical user interfaces the user-input options are located in S604; transmitting, from the server to the client, the behavioral expectations in S606; executing, at the client, user events for the graphical user interfaces in S608; analyzing behaviorally, by the client using artificial intelligence or machine learning or other rule-based processing, the user events in S610; generating, by the client, behavioral vectors corresponding to the user events, said behavioral vectors composed based on the event codes and the user-interface (X-Y) coordinates in S612; generating, by the client based on the behavioral vectors, client hashes for each of the graphical user interfaces that culminate in a final client hash in S614; transmitting, by the client to the server, the user events in S616; generating, by the server based on the behavioral expectations and the user events, a server hash in S618; comparing, by the server, the final client hash to the server hash in S620; approving, by the server, the immutable transaction if the final client hash matches the server hash in S622; detecting, by the server, tampering if the final client hash does not match the server hash in S624; reporting, by the server, the tampering in S626; and rejecting, by the server, the immutable transaction if the final client hash does not match the server hash in S628, wherein the foregoing steps may be implemented a computer-executable instructions stored on computer readable-media. It should be noted that many of these steps are optional and not required to implement one or more of the disclosures contained herein. Also, additional relevant steps, structure, and/or function may be utilized in conjunction with the foregoing and will still be within the spirit and scope of the present disclosures.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A cyber-security, behavior-generated, event-type signed process comprises the steps of:
   (a) transmitting, by a client to a server, a request for an immutable transaction;
   (b) transmitting, by the server to the client, interactions responsive to the request;
   (c) generating, by the server, behavioral expectations for the interactions;
   (d) transmitting, from the server to the client, the behavioral expectations;
   (e) executing, at the client, user events for the interactions;
   (f) analyzing behaviorally, by the client, the user events;
   (g) generating, by the client, behavioral vectors corresponding to the user events;
   (h) generating, by the client based on the behavioral vectors, intermediate client hashes that culminate in a final client hash;
   (i) transmitting, by the client to the server, the user events;
   (j) generating, by the server based on the behavioral expectations and the user events, a server hash;
   (k) comparing, by the server, the final client hash to the server hash;
   (l) approving, by the server, the immutable transaction if the final client hash matches the server hash; and
   (m) rejecting, by the server, the immutable transaction if the final client hash does not match the server hash.

2. The cyber-security, behavior-generated, event-type signed process of claim 1 wherein the interactions are graphical user interfaces with contents that include user-input options with corresponding event types and user-interface (X-Y) coordinates corresponding to where in the graphical user interfaces the user-input options are located.

3. The cyber-security, behavior-generated, event-type signed process of claim 2 wherein the user-input options include textboxes.

4. The cyber-security, behavior-generated, event-type signed process of claim 3 wherein of the user interface (X,Y) coordinates correspond to unique UI codes for each of said graphical user interfaces.

5. The cyber-security, behavior-generated, event-type signed process of claim 4 wherein the user events at the client comprise: first input-device clicking in the textboxes and keyboard typing in the textboxes.

6. The cyber-security, behavior-generated, event-type signed process of claim 5 wherein user events at the client further comprise second input-device selection of one or more linked graphical objects or text hyperlinks in the graphical user interfaces.

7. The cyber-security, behavior-generated, event-type signed process of claim 6 wherein user events at the client further comprise scrolling within the graphical user interfaces.

8. The cyber-security, behavior-generated, event-type signed process of claim 7 wherein the behavioral expectations correspond to what the server expects to receive from the client for the event types and the user-interface (X-Y) coordinates as to where in the graphical user interfaces the user-input options are located.

9. The cyber-security, behavior-generated, event-type signed process of claim 8 wherein the behavioral vectors are composed based on the event codes and the user-interface (X-Y) coordinates.

10. The cyber-security, behavior-generated, event-type signed process of claim 9 wherein the behavioral vectors are one dimensional.

11. The cyber-security, behavior-generated, event-type signed process of claim 9 wherein the behavioral vectors are multi-dimensional.

12. The cyber-security, behavior-generated, event-type signed process of claim 8 wherein each of said client hashes is based on one of said behavioral vectors, which corresponds to one of said graphical user interfaces.

13. The cyber-security, behavior-generated, event-type signed process of claim 12 wherein at least some of said client hashes are based on one of said behavioral vectors and at least one prior of said client hashes.

14. The cyber-security, behavior-generated, event-type signed process of claim 13 comprising the steps of: (a) detecting, by the server, tampering if the final client hash does not match the server hash, and (b) reporting, by the server, the tampering.

15. The cyber-security, behavior-generated, event-type signed process of claim 14 wherein the step of analyzing behaviorally is performed based on artificial intelligence.

16. The cyber-security, behavior-generated, event-type signed process of claim 14 wherein the step of analyzing behaviorally is performed based on machine learning.

17. The cyber-security, behavior-generated, event-type signed process of claim 15 in which the steps are implemented as computer-executable instructions stored on computer-readable media.

18. The cyber-security, behavior-generated, event-type signed process of claim 16 in which the steps are implemented as computer-executable instructions stored on computer-readable media.

19. A cyber-security, behavior-generated, event-type signed process comprises the steps of:
   (a) transmitting, by a client to a server, a request for an immutable transaction;
   (b) transmitting, by the server to the client, a series of graphical user interfaces responsive to the request, said graphical user interfaces having contents that include user-input options with corresponding event types and user-interface (X-Y) coordinates corresponding to where in the graphical user interfaces the user-input options are located, said user-input options selected from the group consisting of: first input-device clicking in the textboxes and keyboard typing in the textboxes, second input-device selection of one or more linked graphical objects or text hyperlinks in the graphical user interfaces, and scrolling within the graphical user interfaces;
   (c) generating, by the server, behavioral expectations for the graphical user interfaces, said behavioral expectations corresponding to what the server at least partially sequentially expects to receive from the client for the event types and the user-interface (X-Y) coordinates as to where in the graphical user interfaces the user-input options are located;

(d) transmitting, from the server to the client, the behavioral expectations;

(e) executing, at the client, user events for the graphical user interfaces;

(f) analyzing behaviorally, by the client using artificial intelligence or machine learning, the user events;

(g) generating, by the client, behavioral vectors corresponding to the user events, said behavioral vectors composed based on the event codes and the user-interface (X-Y) coordinates;

(h) generating, by the client based on the behavioral vectors, intermediate client hashes for each of the graphical user interfaces that culminate in a final client hash;

(i) transmitting, by the client to the server, the user events;

(j) generating, by the server based on the behavioral expectations and the user events, a server hash;

(k) comparing, by the server, the final client hash to the server hash;

(l) approving, by the server, the immutable transaction if the final client hash matches the server hash;

(m) detecting, by the server, tampering if the final client hash does not match the server hash;

(n) reporting, by the server, the tampering; and (o) rejecting, by the server, the immutable transaction if the final client hash does not match the server hash, wherein the foregoing steps are implemented as computer-executable instructions stored on computer-readable media.

20. A cyber-security, behavior-generated, event-type signed process comprises the steps of:

(a) transmitting, by a client to a server, a request for an immutable transaction;

(b) transmitting, by the server to the client, a series of graphical user interfaces responsive to the request, said graphical user interfaces having contents that include user-input options with corresponding event types and user-interface (X-Y) coordinates corresponding to where in the graphical user interfaces the user-input options are located, said user-input options selected from the group consisting of: first input-device clicking in the textboxes and keyboard typing in the textboxes, second input-device selection of one or more linked graphical objects or text hyperlinks in the graphical user interfaces, and scrolling within the graphical user interfaces;

(c) generating, by the server, behavioral expectations for the graphical user interfaces, said behavioral expectations corresponding to what the server at least partially non-sequentially expects to receive from the client for the event types and the user-interface (X-Y) coordinates as to where in the graphical user interfaces the user-input options are located;

(d) transmitting, from the server to the client, the behavioral expectations;

(e) executing, at the client, user events for the graphical user interfaces;

(f) analyzing behaviorally, by the client using artificial intelligence or machine learning, the user events;

(g) generating, by the client, behavioral vectors corresponding to the user events, said behavioral vectors composed based on the event codes and the user-interface (X-Y) coordinates;

(h) generating, by the client based on the behavioral vectors, intermediate client hashes for each of the graphical user interfaces that culminate in a final client hash;

(i) transmitting, by the client to the server, the user events;

(j) generating, by the server based on the behavioral expectations and the user events, a server hash;

(k) comparing, by the server, the final client hash to the server hash;

(l) approving, by the server, the immutable transaction if the final client hash matches the server hash; and (m) detecting, by the server, tampering if the final client hash does not match the server hash;

(n) reporting, by the server, the tampering; and (o) rejecting, by the server, the immutable transaction if the final client hash does not match the server hash, wherein the foregoing steps are implemented as computer-executable instructions stored on computer-readable media.

* * * * *